(12) United States Patent
Nuno (10) Patent No.: US 7,871,204 B2
(45) Date of Patent: Jan. 18, 2011

(54) LENS BARREL AND MOBILE INFORMATION TERMINAL DEVICE

(75) Inventor: Katsuhiko Nuno, Yokosuka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 12/527,647

(22) PCT Filed: Mar. 7, 2008

(86) PCT No.: PCT/JP2008/054683

§ 371 (c)(1),
(2), (4) Date: Aug. 18, 2009

(87) PCT Pub. No.: WO2008/111657

PCT Pub. Date: Sep. 18, 2008

(65) Prior Publication Data

US 2010/0092167 A1    Apr. 15, 2010

(30) Foreign Application Priority Data

Mar. 9, 2007   (JP) ............... 2007-059547

(51) Int. Cl.
*G03B 3/02* (2006.01)
*G03B 17/04* (2006.01)

(52) U.S. Cl. .................. 396/349; 396/529
(58) Field of Classification Search ......... 396/348–350, 396/529
See application file for complete search history.

(56) References Cited

U.S. PATENT DOCUMENTS

| | | | |
|---|---|---|---|
| 4,264,170 A | 4/1981 | Kurei | |
| 4,720,167 A | 1/1988 | Okura | |
| 5,057,925 A | 10/1991 | Tsutsui et al. | |
| 6,049,432 A | 4/2000 | Machida et al. | |
| 7,218,460 B2 | 5/2007 | Nuno | |
| 7,259,923 B2 | 8/2007 | Nuno et al. | |
| 7,382,553 B2 | 6/2008 | Nuno | |
| 7,595,940 B2 | 9/2009 | Nuno | |
| 2003/0174412 A1 | 9/2003 | Noguchi | |
| 2006/0017836 A1 | 1/2006 | Nuno et al. | |
| 2006/0018654 A1 | 1/2006 | Nuno et al. | |

(Continued)

FOREIGN PATENT DOCUMENTS

JP    6-347687 A    12/1994

(Continued)

*Primary Examiner*—W. B. Perkey
*Assistant Examiner*—Dennis Hancock
(74) *Attorney, Agent, or Firm*—Dickstein Shapiro LLP (57) ABSTRACT

Disclosed is a lens barrel capable of placing at least a part of multiple lens groups in a retraction status in which the part of the multiple lens groups are accommodated in the lens barrel, and at least a part of the multiple lens groups in a photographing status in which the part of the multiple lens groups are moved closer to an object. The distance between a first lens group (11) located closest to the object and a second lens group (12) located second closest to the object changes in the optical axis direction. A spring mechanism (30) having a compression spring function and a torsion coil spring function in combination is arranged between the first lens group (11) and the second lens group (12). This spring mechanism biases (30) at least the second lens group (12) in the optical axis direction and in a rotational direction in a plane perpendicular to the optical axis.

6 Claims, 3 Drawing Sheets

U.S. PATENT DOCUMENTS

| | | | |
|---|---|---|---|
| 2006/0209192 A1* | 9/2006 | Shinohara et al. | 348/207.99 |
| 2006/0268430 A1 | 11/2006 | Sasaki | |
| 2007/0097519 A1 | 5/2007 | Nuno | |
| 2008/0019681 A1 | 1/2008 | Nuno | |
| 2008/0117527 A1 | 5/2008 | Nuno et al. | |
| 2008/0310035 A1* | 12/2008 | Kato | 359/817 |

FOREIGN PATENT DOCUMENTS

| | | |
|---|---|---|
| JP | 7-043779 A | 2/1995 |
| JP | 2006-030291 A | 2/2006 |
| JP | 2006-039152 A | 2/2006 |
| JP | 2007-010944 A | 1/2007 |
| JP | 2007-041405 A | 2/2007 |

* cited by examiner

LENS BARREL AND MOBILE INFORMATION TERMINAL DEVICE

CROSS REFERENCE TO THE RELATED APPLICATION

The present application is based on and claims priority from Japanese Patent Application No. 2007-059547, filed on Mar. 9, 2007, the disclosure of which is hereby incorporated by reference herein in its entirety.

TECHNICAL FIELD

The present invention relates to a lens barrel and a mobile information terminal device using the lens barrel as a photographing optical system of its camera functioning unit, both of which position movable lenses with improved precision.

BACKGROUND ART

Photographic lenses used for a camera are grouped into multiple lens groups. The lens groups are configured to change the distances in an optical axis between the lens groups in order to fulfill their functions including a focusing function, a zooming function or smooth focal-length changing function, and a retracting function. Particularly, in a photographic lens having a zooming function and/or a retracting function, the distance each lens group moves is so long that the configuration of the lens barrel is complicated.

There has recently been demands that photographing apparatuses such as digital cameras should deliver higher performance with a zooming function to provide high-quality images, and that the photographing apparatuses also should be reduced in size for the purpose of improving their portability. Advancement of technical development has been satisfying those demands. A retractable lens barrel is an effective solution for satisfying the demand for the size reduction of photographing apparatuses. For this reason, a growing number of cameras each having a retractable lens barrel are used. However, in the case where a lens barrel adapted for a retractable camera simply move and retrace the whole lens groups constituting the lens system in the optical axis direction, this design poses a limit on reduction of the length of the whole lens barrel in the retracted state, and accordingly imposes a restriction on constructing thinner camera main bodies.

With this taken into consideration, a photographing apparatus of a type including a mechanism for withdrawing some of the lens groups from the optical axis, and concurrently for retracting the rest of the lens groups in the optical axis direction, has been proposed and thus put into practical use. An example of this case is an invention which has been made by the inventor of the present invention, and which is disclosed in Japanese Patent Application Publication No. 2006-39152. In the case of the invention disclosed in Japanese Patent Application Publication No. 2006-39152, a cam groove is formed in an inner surface of a fixation frame to have its own object-side end portion in parallel with an end surface of a fixation cylinder.

With this configuration, by being engaged with a cam follower of a first revolvable cylinder, the cam groove extracts the first revolvable cylinder to the maximum exaction position while driving the lens groups from the retracted position to the short-focal-point/wide-angle end, and then idly revolves the first revolvable cylinder while driving the lens groups from their short-focal-point/wide-angle end to their long-focal-point/telephoto end. In other words, this cam groove is made for a withdrawn third lens group to quickly advance onto the optical axis by extracting the first revolvable cylinder fully in an earlier phase of the operation for extracting the lens groups, and thereby by securing a space for a frame of the third lens group to be inserted onto the optical axis.

It is necessary that, among the photographic lenses, lens groups movable in the optical axis direction should be firmly held at their stop position. Particularly in the case of the lens barrel adapted for the retractable camera, the lens groups move such long distances that it is difficult to firmly hold the lens groups at their respective stop positions no matter what positions the lens groups may stop at. The reason for this difficulty is that there is a gap between a straight advancement guiding groove and the cam follower as well as a gap between the cam groove and the cam follower in the lens barrel using a lens group moving mechanism, which includes the straight advancement guiding groove and the cam groove crossing the straight advancement guiding groove as a mechanism for moving the lens groups in long distances, and which is constructed by fitting the cam follower integrated with the lens groups into an intersection between the above-mentioned straight advancement guiding groove and the cam groove.

This is because, although as a mechanism for moving lens groups in long distances used is a lens moving mechanism including a straight advancement guiding groove and a cam groove crossing the straight advancement guiding groove, and configured by fitting a cam follower integrated with the lens groups into an intersection between the straight advancement guiding groove and the cam groove, this mechanism inevitably has a gap, which is even a very slight gap, between the cam groove and each of the straight advancement guiding groove and the cam groove.

The lens groups move in these gaps, which makes the positions of the lenses unstable. Such instability puts the lenses out of focus as well as reduces the resolution of the lenses. This kind of problem is not peculiar to the invention disclosed in Japanese Patent Application Publication No. 2006-39152, but is common among retractable cameras and among lens barrels each including the lens moving mechanism having the cam groove and the cam follower.

DISCLOSURE OF THE INVENTION

An object of the present invention is to provide a lens barrel which changes the distance at least between neighboring two of lens groups in an optical axis direction, the lens barrel being capable of unmovably holding the lens groups at their respective stop positions and thus maintaining the lens positions firmly, the lens barrel being capable of not putting the lenses out of focus, the lens barrel being capable of having a higher resolution, for instance, even though the lens barrel includes a lens moving mechanism which is constructed by fitting a cam follower integrated with the lens group into an intersection between a straight advancement guiding groove and a cam groove, or even if there is a gap between the above-mentioned straight advancement guiding groove and the above-mentioned cam follower as well as between the cam groove and the cam follower.

Another object of the present invention is to provide a mobile information terminal device having a camera functioning unit, the mobile information terminal device using the lens barrel according to the foregoing present invention as a photographing optical system of the camera functioning unit, as well as being accordingly capable of firmly maintaining the lens positions, not putting the lenses out of focus, and thus acquiring a high-quality image.

For the purpose of achieving the above-described objects, a lens barrel according to one embodiment of the present invention includes multiple lens groups, and which changes the distance at least between neighboring two of the lens groups in the optical axis direction, has a spring having, in combination, a compression spring function and a torsion coil spring function between two neighboring lens groups whose mutual distance changes in the optical axis direction; and accordingly the lens groups are each spring-biased in the optical axis direction and in a rotational direction in a plane orthogonal to the optical axis.

The present invention provides a lens barrel capable of placing at least a part of multiple lens groups in a retraction status in which the part of the multiple lens groups are accommodated in the lens barrel and at least a part of the multiple lens groups in a photographing status in which the part of the multiple lens groups are moved closer to an object. The lens barrel is characterized in that: the distance between a first lens group located closest to the object and a second lens group located second closest to the object changes in the optical axis direction; a spring mechanism having a compression spring function and a torsion coil spring function in combination is arranged between the first lens group and the second lens group; and this spring mechanism biases at least the second lens group in the optical axis direction and in a rotational direction in a plane orthogonal to the optical axis.

BEST MODE FOR CARRYING OUT THE INVENTION

Detailed descriptions will be provided hereinbelow for the preferred embodiments of the present invention by referring to the accompanying drawings.

First Embodiment

Figure 1:
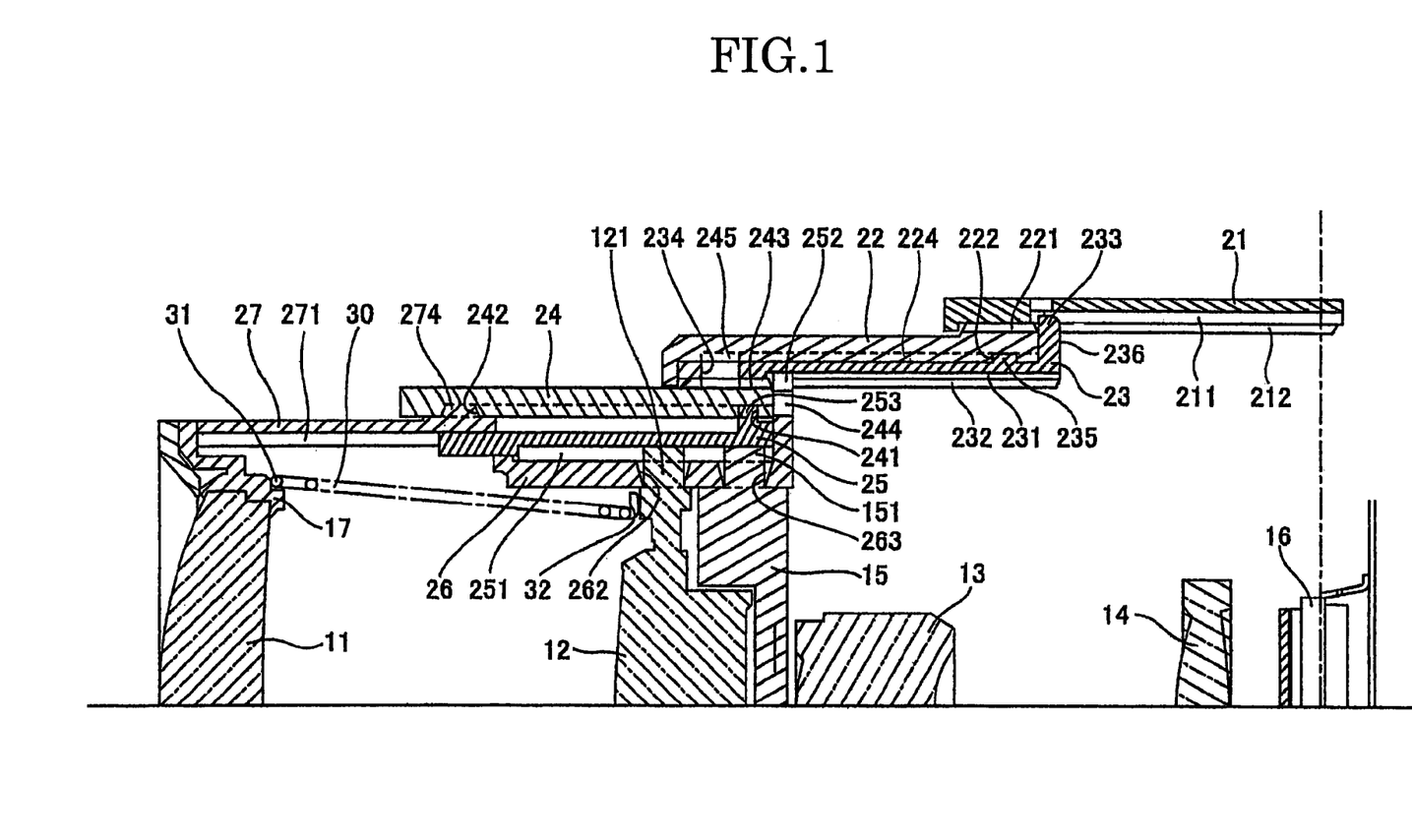
FIG. 1 is a longitudinal sectional view showing a half of a lens barrel according to a first embodiment of the present invention.

FIG. 1 illustrates a first embodiment of a lens barrel according to a first embodiment of the present invention. The left half of FIG. 1 represents a side closer to an object, whereas the right half of FIG. 1 represents a side closer to an image surface.

The lens barrel in the first embodiment includes, for example, four lens groups in which a first lens group 11 which is disposed at the closest position to the object, a second lens group 12, a third lens group 13, a fourth lens group 14 which are arranged in order from the first lens group 11 to the image surface. The lens barrel also includes a shutter/stop unit 15 which is arranged between the second lens group 12 and the third lens group 13. An image pickup element 16, for example, including CCDs and the like is fixed to a back portion of the fourth lens group 14.

The first lens group 11, the second lens group 12, and the shutter/stop unit 15 are configured to be moved in the optical axis direction by a moving mechanism, which will be described later. The lens barrel according to the first embodiment is a collapsed lens barrel. When this lens barrel is collapsed, the first lens group 11, the second lens group 12, and the shutter/stop unit 15 are moved in an optical axis direction toward the fourth lens group 14, while the first lens group 11 and the second lens group 12 are configured to be closer to each other. In addition, when the lens barrel is collapsed, the third lens group 13 is configured to move in a plane orthogonal to the optical axis so that the third lens group 13 is retracted from the optical axis out of the lens barrel. A mechanism to retract the third lens group 13 has nothing directly to do with the present invention. For this reason, the illustration for the retracting mechanism is omitted from FIG. 1.

In the case of the lens barrel according to the first embodiment, the moving mechanism for the movable lens groups and the shutter/stop unit 15 is assembled by using a fixation frame or cylinder 21 as a base. An end portion of the fixation frame 21 is fixed to a body of a camera, a mobile information terminal device or the like to which this lens barrel is embedded. A straight advancement groove 211 extending in parallel with the optical axis is formed in an inner periphery of the fixation frame 21, and a female feed screw 212 is formed almost throughout substantially the whole fixation frame 21 in its longitudinal direction. A first revolvable cylinder 22 is fitted in the inner periphery of the fixation frame 21, and a male screw 221 is formed in the outer periphery in a rear end portion of the revolvable cylinder 22 (a right end portion thereof in FIG. 1; and hereinafter the same). This screw 221 meshes with the above-mentioned feed screw 212.

The first revolvable cylinder 22 is revolutionarily driven about the optical axis by a motor or the like, which is not illustrated here. When the first revolvable cylinder 22 is revolutionarily driven, the above-mentioned male screw 221 moves in the optical axis direction while guided by the above-mentioned feed screw 212.

A first liner 23 is fitted to the inner periphery of the first revolvable cylinder 22. The first liner 23 has a flange 236 in its rear end portion. This flange 236 is in contact with the rear end surface of the first revolvable cylinder 22. The first liner 23 additionally has a protrusion 235 on its outer periphery near its rear end. The protrusion 235 is fitted in a circumferential groove 222 which is formed in a direction orthogonal to the optical axis in the inner periphery of the first revolvable cylinder 22. As a result, the first liner 23 is capable of revolving in its circumferential direction relative to the first revolvable body 22 while guided by the circumferential groove 222, but the revolution of the first liner 23 is restricted because a key part 233, formed in the outer periphery of the above-mentioned flange 236, is fitted in the straight advancement groove 211 of the fixation cylinder 21. Accordingly, only the first revolvable cylinder 22 is capable of revolving without restriction.

A straight advancement groove 231 extending in parallel with the optical axis is formed in the inner periphery of the first liner 23, and a female feed screw 232 is formed throughout substantially the whole liner 23 in the longitudinal direction of the liner 23. In addition, a cam groove 234 is formed in the first liner 23 to penetrate the first liner 23 in the thickness direction of the first liner 23. A second revolvable cylinder 24 is fitted in the first revolvable cylinder 22. A straight advancement groove 224 extending in parallel with the optical axis is formed in the inner periphery of the above-mentioned first revolvable cylinder 22. The straight advancement groove 224 then overlaps and crosses over the cam groove 234 in its radial direction.

A cam follower 245 protruding from an outer peripheral surface of the second revolvable cylinder 24 is fitted in the intersection between the straight advancement groove 224 and the cam groove 234. The second revolvable cylinder 24 additionally has a male screw 243 in its outer periphery. This screw 243 meshes with the above-mentioned feed screw 232. When the second revolvable cylinder 24 revolves relative to the first liner 23, the male screw 243 moves in the optical axis direction while guided by the feed screw 232.

A second liner 25 is, fitted in the inner periphery of the second revolvable cylinder 24. A protrusion 253, formed in the outer periphery of the second liner 25 in its rear end portion, is fitted in a groove 241 formed to extend in a peripheral direction in the inner periphery of the second revolvable body 24. In addition, a key part 252 is formed in the rear end of the second liner 25 to extend outwardly in a radial direction of the second liner 25, and is fitted in the straight advancement groove 231 in the first liner 23. A cam cylinder 26 is fitted in the inner peripheral side of the second liner 25. An engagement part is formed integrally with the cam cylinder 26 to protrude outward from the rear end portion of the cam cylinder 26 in a radial direction. The engagement part thus formed engages with an engagement part 244 which protrudes rearward from the rear end of the second revolvable cylinder 24. This engagement allows the cam cylinder 26 to move in the optical axis direction while revolving integrally with the second revolvable cylinder 24.

Once the first revolvable cylinder 22 is revolutionarily driven, the intersection between the straight advancement groove 224 in the first revolvable cylinder 22 and the cam groove 234 in the first liner 23 moves in the optical axis direction, and the second revolvable cylinder 24 moves in the optical axis direction along with the cam follower 245 fitted in this intersection, because the first liner 23 is incapable of revolving. In addition, while the second revolvable cylinder 24 moves in the optical axis direction, the guidance of the male screw 243 of the second revolvable cylinder 24 by the feed screw 232 of the first liner 23 imparts a revolutionary force to the second revolvable cylinder 24.

Consequently, the second revolvable cylinder 24 revolves while moving in the optical axis direction, as described above. Because the second revolvable cylinder and the cam cylinder 26 are formed as the virtual integral unit as described above, the cam cylinder 26 along with the second revolvable cylinder 24 revolves while moving in the optical axis direction. By contrast, the second liner 25 is incapable of revolving along with the second revolvable cylinder 24, because the key part 252 is fitted in the above-mentioned straight advancement groove 231 as described above.

A cylindrical clearance exists between the inner peripheral surface of the second revolvable cylinder 24 and the outer peripheral surface of the second liner 25, except for the rear end portion of the second liner 25. A straight advancement cylinder 27 is fitted in this clearance. A protruding ridge 271 extending in parallel to the optical axis direction is formed in the inner periphery of the straight advancement cylinder 27, and this protruding ridge 271 is fitted in the straight advancement groove in the second liner 25. Thereby, the straight advancement cylinder 27 is configured to be capable of moving straight in the optical axis direction relative to the second revolvable cylinder 24. A cam groove 242 is formed in the inner peripheral side of the second revolvable cylinder 24, and a cam follower 274 is fitted in this cam groove 242. The cam follower 274 is formed on the outer periphery in the base end portion of the straight advancement cylinder 27 to protrude from the outer periphery of the straight advancement cylinder 27.

As a result, the revolution of the second revolvable cylinder 24 causes the straight advancement cylinder 27 to move in the optical axis direction while guided by the above-mentioned straight advancement groove in the second liner 25 without revolving relative to the second revolvable cylinder 24. The first lens group 11 is attached to the straight advancement cylinder 27 with a lens frame 17 interposed in between.

A straight advancement groove 251 is formed in the inner peripheral side of the second liner 25. Two cam grooves 262 and 263 capable of crossing over the above-mentioned straight advancement groove 251 are formed tandem in the cam cylinder 26 to penetrate the cam cylinder 26 in a radial direction of the cam cylinder 26. A cam follower 121 provided integrally with a lens frame, which holds the second lens group 12, is fitted in the intersection between the above-mentioned straight advancement groove 251 and the cam groove 262 which is located in the front position out of the two tandem cam grooves. A cam follower 151 provided integrally with the shutter/stop unit 15 is fitted in the intersection between the above-mentioned straight advancement groove 251 and the cam groove 263 which is located in the rear position out of the two tandem cam grooves.

Thus, the cam follower 121 is fitted in the intersection between the front cam groove 262 and the straight advancement groove 251, while the cam follower 151 is fitted in the intersection between the rear cam groove 263 and the straight advancement groove 251. As a result, once the cam cylinder 26 revolves along with the second revolvable cylinder 24, the two intersections move in the optical axis direction because the second liner 25 is not allowed to revolve. With this movement, the second lens group 12 and the shutter/stop unit 15 move in the optical axis direction.

Descriptions will be provided for how the lens moving mechanism which has been described operates. FIG. 1 shows how the lens groups look when the lens groups move from their respective retraction positions in which the lens groups are accommodated to their respective short-focal-point/wide-angle ends. It is assumed that the lens groups are in their respective retraction positions where the first lens group 11 and the second lens group 12 come closer to the fourth lens group 14 with the third lens group 13 being withdrawn from the optical axis. Once a camera or the like in which the lens barrel is built is set in a photographing mode, the first revolvable cylinder 22 is revolutionarily driven by a motor, which is not illustrated in FIG. 1.

The revolution of the second revolvable cylinder 22 causes the screw 221 to advance in the optical axis direction while guided by the feed screw 212 of the fixation cylinder 21. Along with the first revolvable cylinder 22, the first liner 23 moves, as well as the second revolvable cylinder 24 and the straight advancement cylinder 27.

Although the first liner 23 moves along with the first revolvable cylinder 22 as described above, the first liner 23 does not revolve because the key part 233 is fitted in the straight advancement groove 211 of the fixation cylinder 21. As a result, the intersection between the straight advancement groove 224 in the first revolvable cylinder 22 and the cam groove 234 in the first liner 2 moves forward, and the second revolvable cylinder 24 accordingly moves forward in the optical axis direction relative to the first revolvable cylinder 22, along with the cam follower 245 fitted in this intersection. The movement of this second revolvable cylinder 24 causes the screw 243 of the second revolvable cylinder 24 to revolve about the optical axis relative to the first revolvable cylinder 22 while guided by the feed screw 232 of the first liner 23. Although the cam cylinder 26 also moves along with the second revolvable cylinder 24 while revolving, the second liner 25 moves only straight in the optical axis direction because the revolution of the second liner 25 is restricted by the fitting of the key part 252 of the second liner 25 in the straight advancement groove 231 in the first liner 23.

The straight advancement cylinder 27 is incapable of revolving about the optical axis because the protruding ridge 271 of the straight advancement cylinder 27 is fitted in the straight advancement groove in the second liner 25. As a result, the revolution of the second revolvable cylinder 24 causes the straight advancement cylinder 27 to advance forward in the optical axis direction relative to the second revolvable cylinder 24, while the cam follower 274 of the straight advancement cylinder 27 is being guided by the cam groove 242 in the second revolvable cylinder 24. In addition, because the cam cylinder 26 revolves whereas the revolution of the second liner 25 is restricted, the second lens group 12 moves forward in the optical axis direction along with the cam follower 121 fitted in the cam groove 262 and the straight advancement groove 251 of the second liner 25, and the shutter/stop unit 15 moves forward in the optical axis direction along with cam follower 151 fitted in the cam groove 263 and the above-mentioned straight advancement groove 251.

The lens groups 11 and 12 as well as the shutter/stop unit 15 move from their respective retraction positions where the lens groups 11 and 12 as well as the shutter/stop unit 15 are accommodated in the lens barrel, to their respective short-focal-point/wide-angle ends as shown in FIG. 1. Meanwhile, the third lens group 13 advances to the optical axis.

When the lens barrel is set in the photographing mode, the zooming operation causes the lens groups to move in the optical axis direction individually. While any zooming mechanism is usable, the zooming operation can be carried out by use of the revolution of the first revolvable cylinder 22 as described in Patent Document 1, for example.

In other words, the front end of the cam groove 234 may be extended in the plane perpendicular to the optical axis so that: the second revolvable cylinder 24 may move and revolve in the optical axis direction by use of the cam groove 234 in the first liner 23 to make an effect on the zooming operation from their retraction positions to their short-focal-point/wide-angle ends; and the second revolvable cylinder 24 may not move in the optical axis direction even while revolving for the zooming operation from the short-focal-point/wide-angle ends to their long-focal-point/telephoto ends.

An image can be zoomed in on by performing the following two operations: making effective the movement and the revolution of the second revolvable cylinder 24 in the optical axis direction by use of the cam groove 234 in the first liner 23, while are moving from their retraction positions to their short-focal-point/wide-angle ends; and extending from the front end of the above-mentioned cam groove 234 in the plane orthogonal to the optical axis in order to cause the second revolvable cylinder 24 to revolve but not to move in the optical axis direction while the lens groups and the shutter/stop unit are moving.

As described above, there is a technical problem for not only lens barrels of the type including the foregoing lens group moving mechanism but also generally-used lens barrels. The technical problem is that the difficulty in firmly holding the movable lenses at their respective stop positions unstably puts the lenses out of focus and accordingly decreases the resolution of the lenses. With this taken into consideration, the first embodiment as shown in FIG. 1 causes a spring mechanism 30 combinedly having both a compression spring function and a torsion coil spring function to be arranged between at least two lens groups whose mutual distance changes in the optical axis direction for the purpose of solving the foregoing problem.

Figure 2:
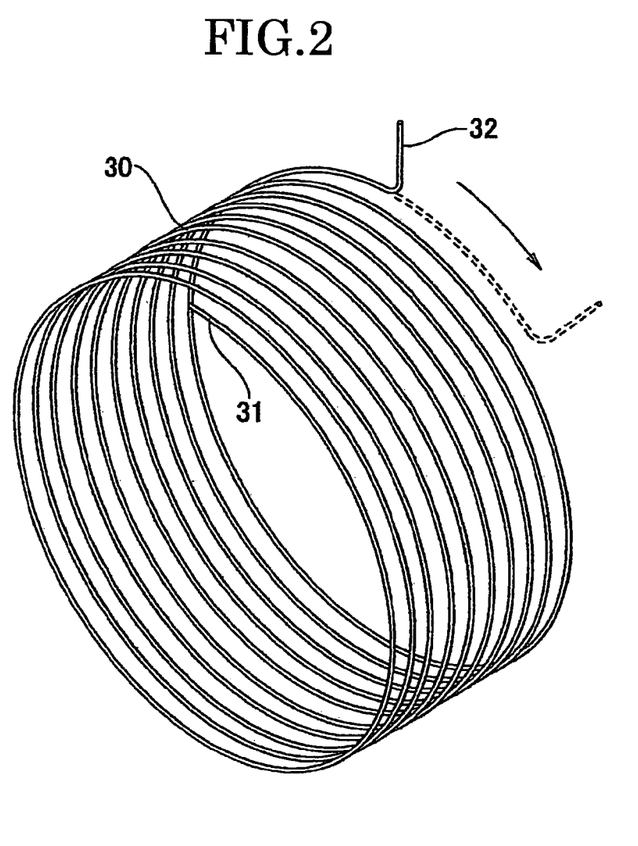
FIG. 2 is a perspective view showing a spring used in the lens barrel according to the first embodiment.

This spring mechanism 30 has, for example, a shape of a spring obtained by forming a wire made of an elastic body into a coil as shown in FIG. 2. This spring mechanism 30 is arranged between the first lens group 11 and the second lens group 12 in the case of the first embodiment shown in FIG. 1.

More specifically, the two ends of the spring mechanism 30 are arranged between an end surface of the lens frame 17 of the first lens group 11 and an end surface of the lens frame of the second lens group 12. This spring mechanism 30 is formed so that its inner diameter is sufficiently larger than the external diameter of an optical path in order not to block the optical path between the lens group 11 and the lens group 12. In addition, because the external diameter of the optical path from the first lens group 11 to the second lens group 12 is shaped like a cone which becomes smaller toward the second lens group 12 from the first lens group 11, the spring mechanism 30 is accordingly shaped like a cone in order to meet the conical shape formed of the external diameter of the optical path.

The spring mechanism 30 is arranged by placing the spring mechanism 30 between the lens group 11 and 12 with the spring mechanism 30 being compressed in the optical axis direction, and thereafter by biasing the spring mechanism 30 in a torsion direction, that is, in a revolutionary direction about the optical axis in a plane perpendicular to the optical axis between a first end part 31 and a second end part 32, as well as subsequently by fixing the first end part 31 to the lens frame 17 of the first lens group 11 and the second end part 32 to the lens frame of the second lens group 12. As a result, the first lens group 11 and the second lens group 12 are biased to move in the optical axis direction relative to each other, and to revolve in the plane perpendicular to the optical axis. These biasing forces are set up so as to be effective even when the distance between the first lens group 11 and the second lens group 12 increases to the maximum.

Figure 3:
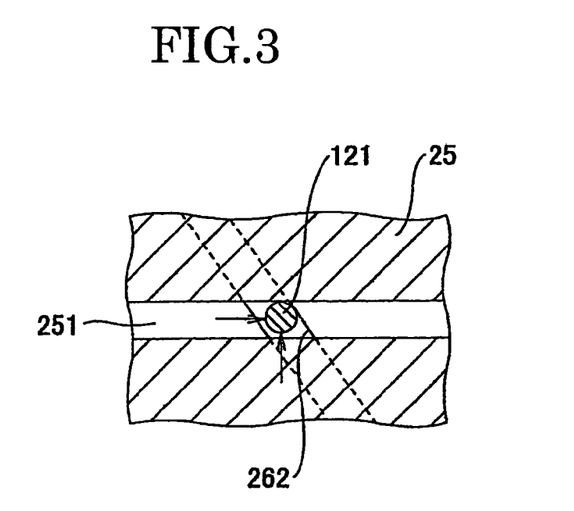
FIG. 3 is a plan cross-sectional view showing a cam follower part illustrating an operation of the spring used in the lens barrel according to the first embodiment.

Descriptions will be provided for an operation brought about by the arranging of the spring mechanism 30 by referring to FIG. 3. FIG. 3 shows how the cam follower 121 of the second lens group 12 is fitted in the intersection between the straight advancement groove 251 in the second liner 25 and the cam groove 262 in the cam cylinder 26. Because the spring mechanism 30 has the biasing force working in the optical axis direction, the spring mechanism 30 presses the cam follower 121 against a side surface of the cam groove 262 with this biasing force. In addition, the spring mechanism 30 presses the cam follower 121 against a side surface of the straight advancement groove 251 with the after-mentioned biasing force, because the spring mechanism 30 has the biasing force working in the direction perpendicular to the optical axis. In this manner, as shown in FIG. 3, the cam follower 121 is always maintained in a condition where the cam follower 121 is pressed against a side surface of the cam groove 26 and a side surface of the cam groove 262, while the cam follower 121 is in the range of its short-focal-point/wide-angle end to its long-focal-point/wide-angle end, and where the cam follower 121 is in the rage of its short-focal-point/wide-angle end to its retraction position. As a result, the second lens group 12 is firmly held at any stop position, and does not move easily.

This makes it possible to stably put the second lens group 12 in focus, and obtain a lens barrel having a higher resolution. This is similarly the case with the first lens group 11 spring-biased by the spring mechanism 30.

Second Embodiment

Figure 4:
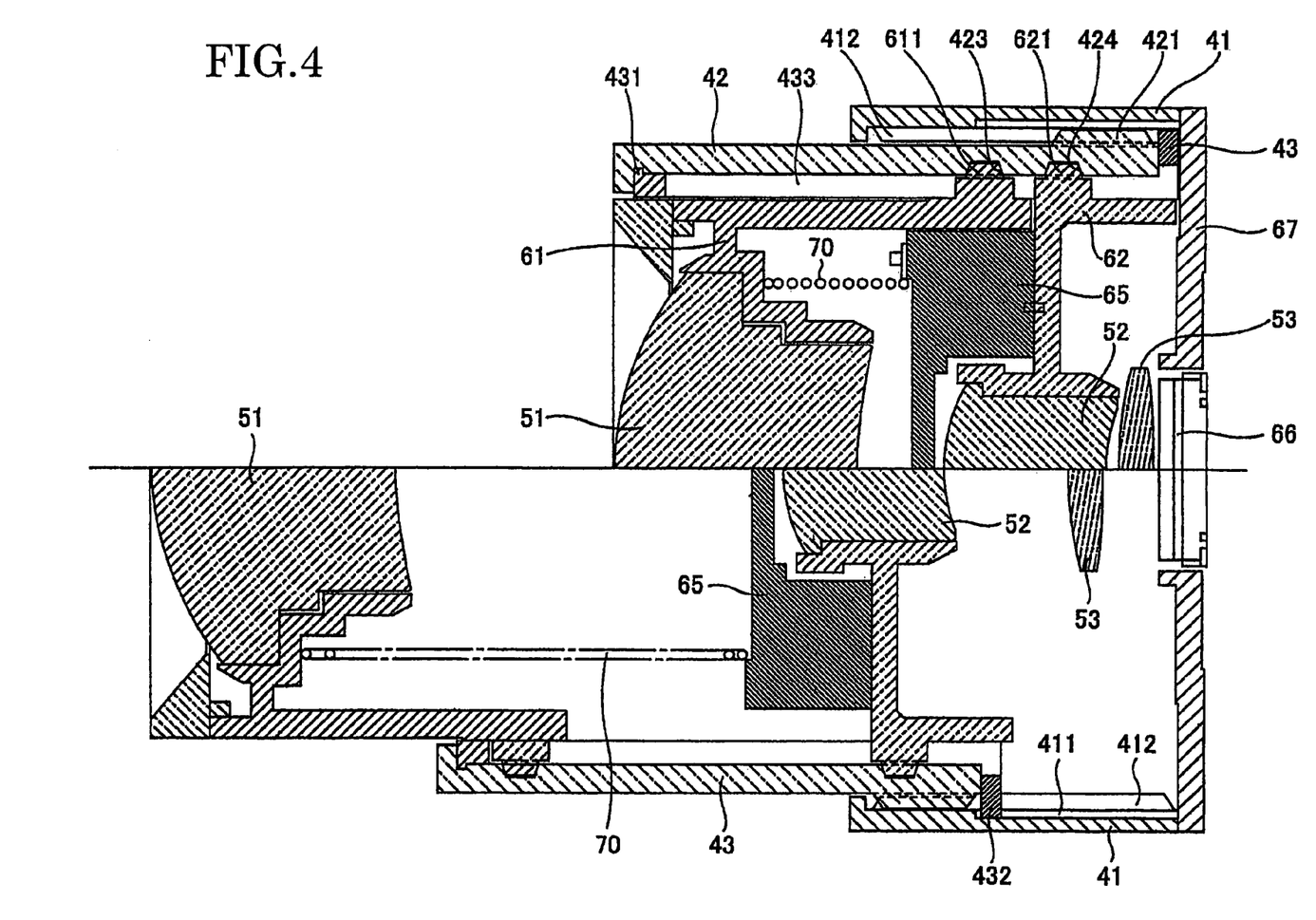
FIG. 4 is a longitudinal sectional view showing how a lens barrel according to a second embodiment looks when the lens barrel is located in a retraction position and in a photographing position.

Descriptions will be provided next for a lens barrel according to a second embodiment as shown in FIG. 4. The lens barrel according to the second embodiment is a retractable lens barrel including no zooming function. The upper half of FIG. 4 shows how the lens barrel operates when the lens barrel is retracted, and the lower half of FIG. 4 shows how the lens barrel operates when the lens barrel is extracted for photographing. The left half of FIG. 4 represents a side closer to an object, and the right half of FIG. 4 represents a side closer to an image surface. As shown in FIG. 4, a base end of a fixation cylinder 41 is fixed to a base plate 67 fixed to a camera body or the like. The base plate 67 has a hole in its center portion, and an image pickup element 66 configured of CCDs and the like is arranged in the hole. The fixation cylinder 41 has a straight advancement groove 411 in its inner peripheral side, and a female feed screw 412 which extends throughout substantially the whole fixation cylinder 41 in its longitudinal direction. A revolvable cylinder 42 is fitted in the inner peripheral side of the fixation cylinder 41, and a cylindrical liner 43 is fitted in the inner peripheral side of the revolvable cylinder 42.

The revolvable cylinder 42 has a male screw 421 in its outer periphery in its rear end portion. This screw 421 meshes with the feed screw 412 in the fixation cylinder 41. As a result, when the revolvable cylinder 42 is revolved about its center axis line (about the optical axis), the screw 421 moves in the optical axis direction while guided by the feed screw 412. The above-mentioned liner 43 has a protrusion 431 which protrudes outward in its radial direction in its outer periphery in its front end portion (the left end portion in FIG. 4). This protrusion 431 is fitted in a circumferential groove formed in the inner periphery in the front end portion of the revolvable cylinder 42. Thereby, the liner 43 is configured to be capable of moving in the optical axis direction along with the revolvable cylinder 42, and concurrently to be capable of revolving relative to the revolvable cylinder 42. The above-mentioned liner 43 protrudes outward in its radial direction from its outer periphery in its rear end portion, and the protruding part constitutes a key 432. The key 432 is fitted in the straight advancement groove 411 in the fixation cylinder 41.

This makes the liner 43 capable of advancing straight along the straight advancement groove 411, but incapable of revolving about the optical axis. The liner 43 has a straight advancement groove 433 which extends in the optical axis direction, and which is formed by penetrating the liner 43 in the thickness direction. Two cam grooves 423 and 424 are formed in the inner peripheral side of the revolvable cylinder 42 to be arranged in tandem in the optical axis direction. The cam grooves 423 and 424 are capable of crossing over the straight advancement groove 433 in a radial direction.

Starting from the front of the lens barrel, a lens frame 61 holding a first lens group 51 and a lens frame 62 holding a second lens group 52 are sequentially fitted in the inner peripheral side of the liner 43. The lens frames 61 and 62 have their cam followers 611 and 621 in their outer peripheral sides, respectively. The cam follower 611 of the lens frame 61 is fitted in the intersection between the above-mentioned cam groove 423 and the straight advancement groove 433, whereas the cam follower 621 of the lens frame 62 is fitted in the intersection between the above-mentioned cam groove 424 and the straight advancement groove 433. Because the revolution of the revolvable cylinder 42 causes the intersection between the above-mentioned cam groove 423 and the straight advancement groove 433 as well as the intersection between the cam groove 424 and the straight advancement groove 433 to move in the optical axis direction, the lens frames 61 and 62 as well as the first lens group 51 and the second lens group 52 held by the lens frames 61 and 62, respectively, move in the optical axis direction along with the cam followers 611 and 621 fitted in their respective intersections.

A shutter/stop unit 65 is arranged between the first lens group 51 and the second lens group 52. The shutter/stop unit 65 moves along with the lens frame 62, because the shutter/stop unit 65 is attached to the lens frame 62 holding the second lens group 52.

Once the revolvable cylinder 42 is revolved for the purpose of extracting the lens groups to their respective photographing positions from their respective retracted positions as shown in the upper half of FIG. 4, the revolvable cylinder 42 moves forward in the optical axis direction while the screw 421 of the revolvable cylinder 42 is being guided by the feed screw 412 in the fixation cylinder 41. The liner 43 advances straightforward along the revolvable cylinder 42 without revolving, because the key 432 of the liner 43 is fitted in the straight advancement groove 411 of the fixation cylinder 41. As described above, the revolution of the revolvable cylinder 42 and the straight advancement of the liner 43 causes the first lens group 51 and the second lens group 52 to move in the optical axis direction, and concurrently causes the shutter/stop unit 65 to move along with the second lens group 52.

An amount of movement of the first lens group 51 in the optical axis direction, and an amount of movement of the second lens group 52 in the optical axis direction, relative to an amount of revolution of the revolvable cylinder 42 depend on the shapes of the respective cam grooves 423 and 424. In the case of the second embodiment shown in FIG. 4, a second lens group 53 is configured to move between its retraction position and its photographing position as well. However, it is arbitrary whether or not the third lens group moves.

A spring mechanism 70 having a compression spring function and a torsion coil spring function in combination is arranged between the frame 61 holding the first lens group 51 located closest to the object and the second lens group 52 adjacent to the first lens group 51. It should be noted that, although the rear end of the spring mechanism 70 is fixed to the shutter/stop unit 65 in the case of the second embodiment shown in FIG. 4, the spring mechanism 70 is virtually connected to the second lens group 52 because the shutter/stop unit 65 is connected to the second lens group 52 virtually integrally.

The function of the spring mechanism 70 is the same as that of the spring mechanism 30 shown in FIGS. 1 and 2. The spring mechanism 70 is capable of firmly holding both the first lens group 51 and the second lens group 52 at their any respective stop positions, and accordingly capable of stably putting the lens groups in focus. This makes it possible to obtain the lens barrel having a higher resolution.

In the case of the lens barrel according to the present invention, because the spring mechanism, arranged between the lens groups whose mutual distance changes in the optical axis direction, has the compression spring function and the torsion coil spring function in combination, the above-mentioned lens groups are spring-biased not only in the optical axis direction but also in the revolutionary direction in the plane perpendicular to the optical axis. In the lens group moving mechanism, unstableness of any lens group at its any stop position can be divided into a component in the optical axis direction and a component in a direction orthogonal to the optical axis direction, that is, in the revolutionary direction about the optical axis. The foregoing spring mechanism eliminates unstableness of the lens group both in the optical axis direction and in the revolutionary direction because the spring mechanism biases the lens group in one of the optical axis directions and in one of the revolutionary directions. Thus, the spring mechanism makes it possible to firmly hold the lens groups at their respective stop positions. This makes it possible to restrain the lens groups from being put out of focus, and accordingly to increase the resolution of the lens system.

Once the present invention is applied to a retractable lens barrel including the spring mechanism having the compression spring function and the torsion coil spring function in combination, this application makes it possible to eliminate unstableness of each of the first and second lens groups in the optical axis direction and in the revolutionary direction, and accordingly to firmly hold the lens groups at their respective stop positions. This makes it possible to restrain the lens groups from being put out of focus, and thus to increase the resolution of the lens system.

In the case of the foregoing embodiments, the spring mechanism has the shape of a coil spring. However, the shape of the spring mechanism according to the present invention is not limited to the shape of the coil spring. The spring mechanism according to the present invention may have any other shape, for example, a shape of any one of a plate spring, a bellows and an accordion, which is tortile.

INDUSTRIAL APPLICABILITY

The lens barrel according to the present invention is capable of being applied to not only various types of cameras, for example, digital cameras, but also mobile information terminal devices which include a photographing function, for example, cellular phones and PDAs (Personal Digital Assistant). This application makes it possible to stably put the lens groups in focus, and accordingly to obtain a high-quality image.

Although the preferred embodiments of the present invention have been described, it should be noted that the present invention is not limited to these embodiments, various changes and modifications can be made to the embodiments.

The invention claimed is:

1. A lens barrel comprising a plurality of lens groups and configured to be capable of placing at least a part of the plurality of lens groups in a retraction status in which the part of the lens groups is, collapsed and at least a part of the plurality of lens groups in a photographing status in which the part of the lens groups is moved toward an object, the plurality of lens groups including a first lens group and a second lens group; and
 a spring mechanism which is provided between the first lens group and the second lens group; and which has a compression spring function and a torsion coil spring function in combination,
 wherein a distance between the first lens group and the second lens group in an optical axis direction is variable,
 wherein the spring mechanism is configured to impart a biasing force in the optical axis direction and a biasing force in a rotational direction in a plane perpendicular to the optical axis to at least one of the first lens group and the second lens group; and
 wherein the second lens group is fixed to a shutter mechanism in an integrated manner.

2. The lens barrel according to claim 1,
 wherein the first lens group is positioned closest to the object,
 wherein the second lens group is disposed in a second close position to the object.

3. The lens barrel according to claim 1, wherein the spring mechanism is arranged out of a path of luminous flux in order not to block the luminous flux which passes through a lens.

4. The lens barrel according to claim 1, wherein an end portion of the spring mechanism is joined to a frame for holding the first lens group, and the other end portion of the spring mechanism is fixed to a frame for holding the second lens group.

5. The lens barrel according to claim 1,
 wherein at least one of the first and second lens groups which are adjacent to each other, and whose mutual distance changes in the optical axis direction, includes a cam follower, and
 the cam follower is fitted into a straight groove extending in the optical axis direction and a cam groove.

6. A mobile information terminal device comprising a camera functioning unit, wherein
 the camera functioning unit includes an optical system using the lens barrel according to claim 1 as a photographing optical system, and an image pickup element is arranged at a location where an image is formed by this optical system.

* * * * *